US012527245B2

United States Patent
Faust et al.

(10) Patent No.: US 12,527,245 B2
(45) Date of Patent: Jan. 20, 2026

(54) AUTOMATED IMAGE-BASED RECEIVING VEHICLE BOUNDARY DETECTION AND CONTROL

(71) Applicant: Deere & Company, Moline, IL (US)

(72) Inventors: Jeremy J. Faust, Grimes, IA (US); Kellen O'Connor, Urbandale, IA (US); Matthew S. Woodall, Chandler, AZ (US)

(73) Assignee: DEERE & COMPANY, Moline, IL (US)

( * ) Notice: Subject to any disclaimer, the term of this patent is extended or adjusted under 35 U.S.C. 154(b) by 223 days.

(21) Appl. No.: 18/065,881

(22) Filed: Dec. 14, 2022

(65) Prior Publication Data

US 2024/0196780 A1 Jun. 20, 2024

(51) Int. Cl.
*A01B 69/04* (2006.01)
*A01D 90/10* (2006.01)
*G05D 1/00* (2006.01)
*G06T 7/73* (2017.01)
*G06V 10/82* (2022.01)
*G06V 20/58* (2022.01)

(52) U.S. Cl.
CPC .......... *A01B 69/008* (2013.01); *A01D 90/105* (2013.01); *G05D 1/0251* (2013.01); *G06T 7/73* (2017.01); *G06V 10/82* (2022.01); *G06V 20/58* (2022.01); *G06T 2207/20084* (2013.01); *G06T 2207/30252* (2013.01)

(58) Field of Classification Search
CPC ...... A01B 69/008; A01D 90/105; G06T 7/73; G06T 2207/2008; G06T 2207/30252; G06V 10/82; G06V 20/58
See application file for complete search history.

(56) References Cited

U.S. PATENT DOCUMENTS

| 9,326,444 | B2 | 5/2016 | Bonefas | |
|---|---|---|---|---|
| 9,704,054 | B1* | 7/2017 | Tappen | G06F 18/23 |
| 10,019,790 | B2 | 7/2018 | Bonefas et al. | |
| 2020/0189103 | A1* | 6/2020 | D'Ercoli | G06N 5/022 |
| 2022/0019241 | A1* | 1/2022 | Christiansen | G05D 1/0293 |
| 2023/0281896 | A1* | 9/2023 | Christiansen | G01F 23/804 |
| | | | | 345/629 |

(Continued)

OTHER PUBLICATIONS

LAGR: Learning Applied to Ground Robotics, https://cs.nyu.edu/~yann/research/lagr, Mar. 31, 2006.

(Continued)

*Primary Examiner* — Kito R Robinson
*Assistant Examiner* — Roy Rhee
(74) *Attorney, Agent, or Firm* — Christopher J. Volkmann; KELLY, HOLT & CHRISTENSON PLLC

(57) ABSTRACT

A harvesting machine is configured to gather harvested material into the harvesting machine during a harvesting operation. A conveyance subsystem configured to convey the harvested material from the harvesting machine to a receiving vehicle during the harvesting operation. An image capture system generates an image of the receiving vehicle and an image processor uses a machine learning system to recognize a boundary of the receiving vehicle. A control system determines a position of the receiving vehicle boundary relative to the harvesting machine, and generates a control signal based on the identified receiving vehicle boundary.

18 Claims, 12 Drawing Sheets

(56) References Cited

U.S. PATENT DOCUMENTS

2023/0320275 A1\* 10/2023 Christiansen ........ G05D 1/0038
                                                            701/50
2024/0180063 A1\*  6/2024 Kocer ...................... G05D 1/80

OTHER PUBLICATIONS https://www.ijcai.org/Proceedings/07/Papers/354.pdf, 2007, 7 pages.
http://yann.lecun.com/exdb/publis/pdf/hadsell-fr-09.pdf, 2009, 31 pages.

\* cited by examiner

AUTOMATED IMAGE-BASED RECEIVING VEHICLE BOUNDARY DETECTION AND CONTROL

FIELD OF THE DESCRIPTION

The present description generally relates to conveying vehicles (such as harvesting machines) that fill receiving vehicles (such as grain carts, semitrailers, or other receiving vehicles). More specifically, but not by limitation, the present description relates to automated control of a filling operation based on machine learned (e.g., artificial intelligence) image processing to identify the boundary of a receiving vehicle.

BACKGROUND

There are a wide variety of different types of material conveying vehicles. The present description relates to many different types of material conveying vehicles and material receiving vehicles. Such vehicles can include construction vehicles such as a cold planer that loads milled or crushed material into a dump truck. Other vehicles are agricultural vehicles. Some agricultural vehicles include agricultural harvesters, such as forage harvesters, combine harvesters, sugarcane harvesters, or other harvesters, that harvest grain or other crop. Such harvesters often unload (conveying the harvested material) into carts or other receiving vehicles which may be pulled by tractors or semitrailers, as the harvesters are moving. The present discussion will proceed with respect to the material conveying vehicle being an agricultural harvester and the receiving vehicle being a towed grain cart or semi-trailer. This is for the sake of example only.

While harvesting in a field using a forage harvester, an operator attempts to control the forage harvester to maintain harvesting efficiency, during many different types of conditions. The soil conditions, crop conditions, etc. can all change. This may result in the operator changing control settings. This means the operator needs to devote a relatively large amount of attention to controlling the forage harvester.

At the same time, a semitruck or tractor-pulled cart, is often in position relative to the forage harvester (e.g., alongside the forage harvester or behind the forage harvester) so that the forage harvester can fill the truck or cart, while moving through the field. In some current systems, this requires the operator of the forage harvester to control the position of the unloading spout and flap so that the truck or cart is filled evenly, but not over filled.

The discussion above is merely provided for general background information and is not intended to be used as an aid in determining the scope of the claimed subject matter.

SUMMARY

A material conveying machine is configured to gather material into the machine. A conveyance subsystem is configured to convey the material from the material conveying machine to a receiving vehicle during the harvesting operation. An image capture system generates an image of the receiving vehicle and an image processor uses a machine learning system to recognize a boundary of the receiving vehicle. A control system determines a position of the receiving vehicle boundary relative to the material conveying machine, and generates a control signal based on the identified receiving vehicle boundary.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
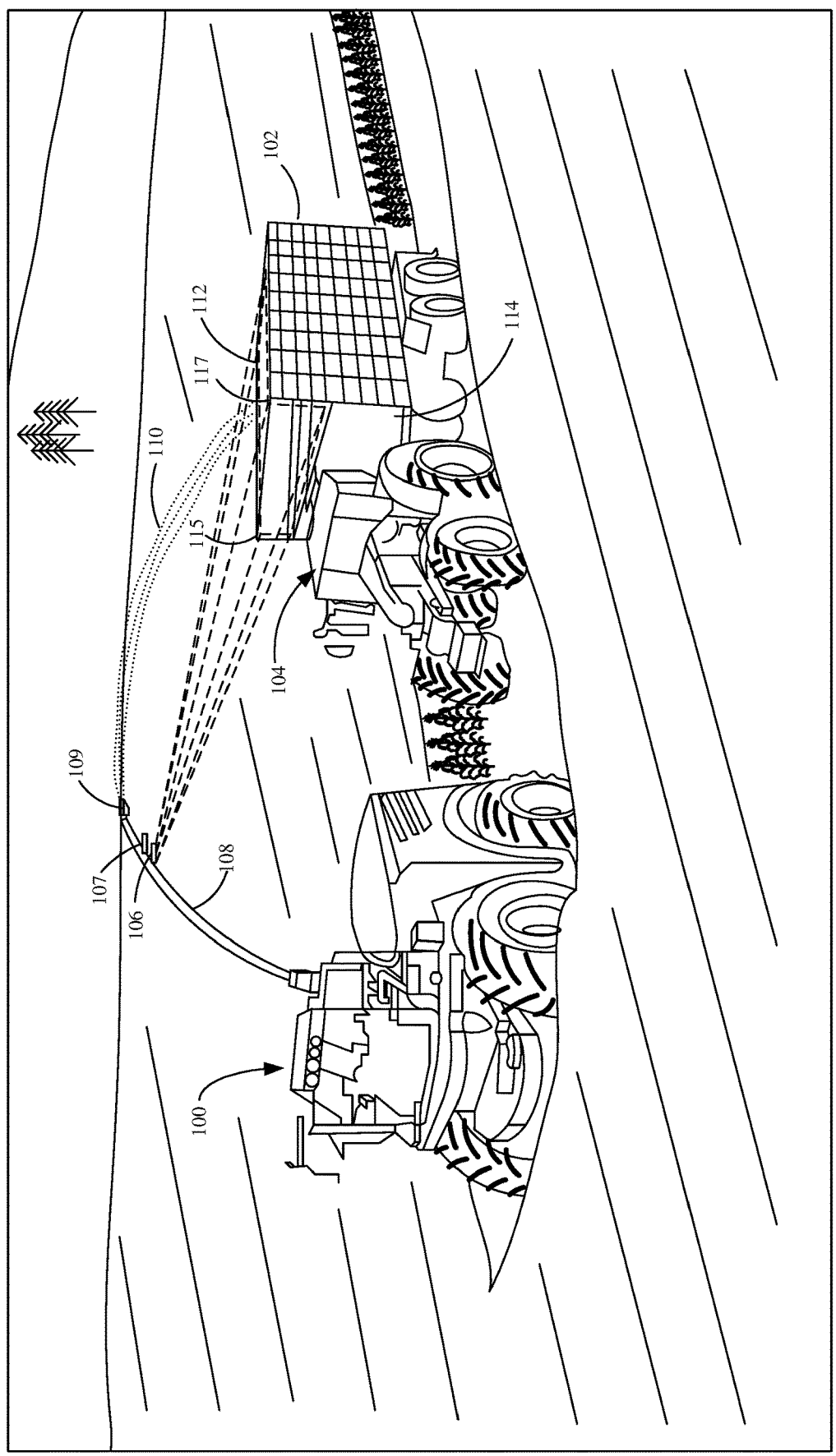
FIG. 1 is a pictorial illustration of one example of a forage harvester filling a tractor-pulled receiving vehicle, with the receiving vehicle following the forage harvester.

As discussed above, it can be very difficult for an operator to maintain high efficiency in controlling a forage harvester, or other type of harvesting machine, and also to optimally control the unloading mechanisms to achieve an efficient fill strategy in filling a receiving vehicle. This often means that the operator needs to control the position of the spout relative to the receiving vehicle, and the flap (to control material trajectory), offsets between the spout and the edges of the receiving vehicle (both front and rear edges, and side edges), among other things. Even a momentary misalignment between the spout and the truck or cart may result in hundreds of pounds of harvested material being dumped on the ground, or dumped on the towing vehicle (and potentially damaging the towing vehicle) rather than in the truck or cart.

In order to address these issues, some automatic or active cart filling control systems have been developed to automate portions of this process. These types of systems currently provide automation for simplifying the unloading process. One such automatic fill control system, uses a sensing system to track the position of the receiving vehicle and to determine the location of where to deposit crop in the receiving vehicle. A stereo camera on the spout of the harvester captures an image of the receiving vehicle. The stereo camera has a field of view that allows the automatic fill control system to capture images of the opening or receiving area of the receiving vehicle. A disparity image is generated from the image generated by the stereo camera. The disparity image is an image which is generated based upon the difference in pixel locations of an item in images of the item taken from two different points of view, such as one taken from one camera of the stereo camera, and one image taken from another camera of the stereo camera. An image processing system attempts to identify the boundary of the receiving vehicle from the disparity image. The sensing system also detects crop height within the receiving vehicle, in order to generate control signals to automatically aim the spout toward empty spots and control the flap position to achieve a filling operation, while reducing spillage.

In some implementations, a camera view, such as a live video feed, from the camera is provided to the operator through a user interface display in the operator compartment. This allows the operator to observe the progress of filling the receiving vehicle in real-time. Also, the user interface display can include user actuatable controls that allow the operator to control various aspects of the filling operation (e.g., control the harvester speed, control the spout and/or flap position, control the receiving vehicle position, etc.).

To accommodate differing field conditions and/or harvesting progress (e.g., whether the area of the field to the side of the current harvester position has already been harvested), the material conveying subsystem (e.g., the unloading mechanisms) on the harvester are actuatable between a side unloading orientation in which the receiving vehicle is alongside the harvester and a rear unloading orientation in which the receiving vehicle is behind and follows the harvester. The stereo camera (which is often mounted on the spout) has a relatively wide field of view (e.g., one hundred and thirty degrees, or greater, in one example) that allows the automatic fill control system to capture images of the opening or receiving area of the receiving vehicle when in the side unloading orientation. However, when in the rear unloading orientation, the camera is positioned further away from the receiving area of the receiving vehicle than when the receiving vehicle is alongside the harvester. This increased distance between the camera position and the receiving area of the receiving vehicle (located behind the harvester) results in a viewing profile of the receiving area that is suboptimal in automatically detecting a boundary of the opening in, or receiving area of, the receiving vehicle.

Therefore, when the receiving vehicle is in the rear unloading position, it can be difficult for the image processor to accurately identify the boundary of the opening in the receiving vehicle. Even when the receiving vehicle is in the side unloading position, it can be difficult, under certain circumstances, for the image processor to identify the boundary of the opening in the receiving vehicle from the disparity image.

For instance, the image processing system is often configured or programmed to look for a rectangle or box-shaped object in the image, in order to identify the opening in the receiving vehicle. However, the top of the towing vehicle (e.g., the top of the tractor cab or semi-tractor cab) may also be rectangular-shaped, so that the image processor may mistakenly identify the top of the towing vehicle as the opening in the receiving vehicle, or the image processor may include the top of the towing vehicle as part of the boundary of the opening in the receiving vehicle. Also, dust or other obscurants can make it difficult for the image processor to identify the opening in the receiving vehicle. Further, one or more of the stereo cameras may have smudges or other debris on the camera lens. This can obfuscate the image and make it difficult for the image processor to identify the boundary of the opening in the receiving vehicle. Similarly, it can be difficult for the image processor to identify the boundary of the opening in the receiving vehicle in poor lighting conditions, or in conditions where the receiving vehicle may be over filled so that crop is spilling out the side of the receiving vehicle. Further, the type of material that the receiving vehicle is made of can make it more difficult to identify the boundary of the opening in the receiving vehicle. For instance, when the sides of the receiving vehicle are made of materials that are smooth, or have very little texture, this can make it difficult to distinguish between the sides of the receiving vehicle and the opening in the receiving vehicle. Similarly, where the receiving vehicle has sides that are formed of expanded metal, or other similar material, this can also make it difficult for the image processor to identify the boundary of the receiving vehicle.

The present description thus proceeds with respect to a control system that receives an image of a receiving vehicle, where the image may be an image from a mono camera, an RGB image, or an image from a stereo camera, or another image generated from an image capture device. The control system uses a trained machine learning system (such as an artificial intelligence system, an artificial neural network, a convolutional neural network, etc.) to identify the boundary of the opening in the receiving vehicle, based on the image (e.g., based on the image itself or based on information derived from the image). The machine learning system can be trained over various anomalies (such as dust or other obscurants, smudges on the camera, poor lighting conditions, conditions where crop is falling over the edge of the receiving vehicle, conditions where the receiving vehicle is formed of different types of material such as smooth textured material, expanded metal, conditions where the towing vehicle may contain confusingly shaped parts—such as the top of the cab, etc.), to still accurately identify the boundary of the opening in the receiving vehicle. This enhances the accuracy in automatically controlling the filling process, both when the receiving vehicle is in the side unloading position and when the receiving vehicle is in the read unloading position. Further, using a machine learning system to identify the boundary of the opening in the receiving vehicle enhances the accuracy of image processing under such adverse conditions.

FIG. 1 is a pictorial illustration showing one example of a self-propelled forage harvester 100 filling a tractor-pulled grain cart (or receiving vehicle) 102. In the example shown in FIG. 1, a tractor 104, that is pulling grain cart 102, is positioned directly behind forage harvester 100. Further, in the illustrated example, forage harvester 100 includes a control system (described in greater deal below) that uses a camera 106 mounted on the spout 108. The spout 108 includes a flap 109. The harvested material 110 is traveling through the spout 108 and can be directed by flap 109. Camera 106 captures an image of the receiving area 112 of cart 102. It is noted that while one camera is illustrated, in one example a plurality of cameras can be mounted on spout 108. For example, a second camera 107 having different characteristics (e.g., a different location, different field of view, different focal length and/or zoom capabilities, etc.) can be utilized.

In one example, a control system on harvester 100 or elsewhere includes image processing, as discussed above, that can identify the boundaries of the receiving area 112 on cart 102 and can also gauge the height of harvested material in cart 102, and the location of that material in cart 102. The control system thus automatically controls actuators that drive the position of spout 108 and/or flap 109 to direct the trajectory of material 110 into the receiving area 112 of cart 102 to obtain an even fill throughout the entire length of cart 102, while not overfilling cart 102. In another example, the control system automatically generates control signals to control harvester 100 and/or the towing vehicle 104 to change the relative position of harvester 100 and receiving vehicle 102. By automatically it is meant, for example, that the operation is performed without further human involvement except, perhaps, to initiate or authorize the operation.

It can be seen in the example of FIG. 1, that the camera 106 can capture an image of a portion of the cart 102. For instance, it can capture an image of the forward portion 114 of cart 102, the corners 115 and 117 of the opening of receiving area 112, the edges of the opening in cart 102 that define the receiving area 112, among other areas. Thus, in one example, the captured images or another item of information, such as a disparity image or a point cloud derived from one or more captured images, can be processed using a machine learning system, such as a deep learning system, an artificial intelligence system, an artificial neural network—ANN, a convolutional neural network—CNN, etc., to identify the boundary of the receiving area 112 and its location relative to harvester 100. The machine learning system can be trained over all of the adverse conditions mentioned above to more accurately identify the boundary of receiving area 112 and to thus increase the accuracy of controlling the automatic filling of the receiving vehicle 102.

Figure 2:
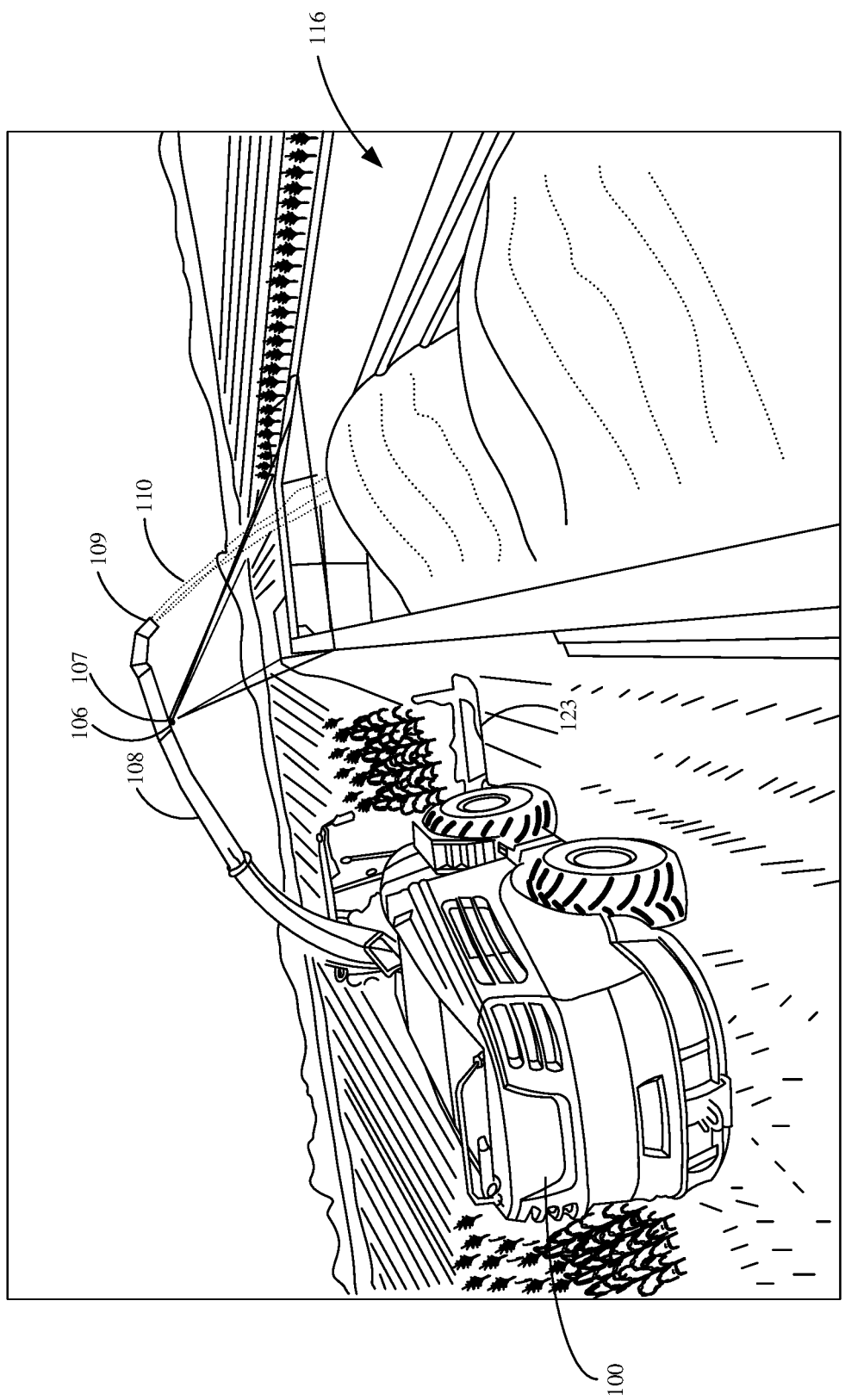
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vehicle) 116 in a configuration in which a semi-tractor is pulling semi-trailer 116 alongside forage harvester 100. Therefore, the spout 108 and flap 109 are positioned to unload the harvested material 110 to fill trailer 116 according to a side-by-side fill strategy. Again, FIG. 2 shows that camera 106 (or a plurality of cameras 106, 107) can capture an image of semi-trailer 116. In the example illustrated in FIG. 2, the field of view of camera 106 is directed toward the receiving area of trailer 116 so that image processing can be performed using the machine learning system to identify the boundary of the edges of trailer 116 defining the receiving area of trailer 116, and to identify the height and position of the material along the elongate axis of trailer 116 (e.g., along the front-to-back axis). In this way, the control system can control the position of spout 108 and flap 109 to direct the material 110 into trailer 116 according to a strategy that provides a relatively even fill, without over filling trailer 116. Again, the machine learning system can process the images captured by camera 106, and/or 107 or a disparity image, point cloud, or other item derived from the image. The image processor can identify corners of the receiving area or other features of the receiving vehicle that can be used to identify the boundary of the receiving area.

Figure 3:
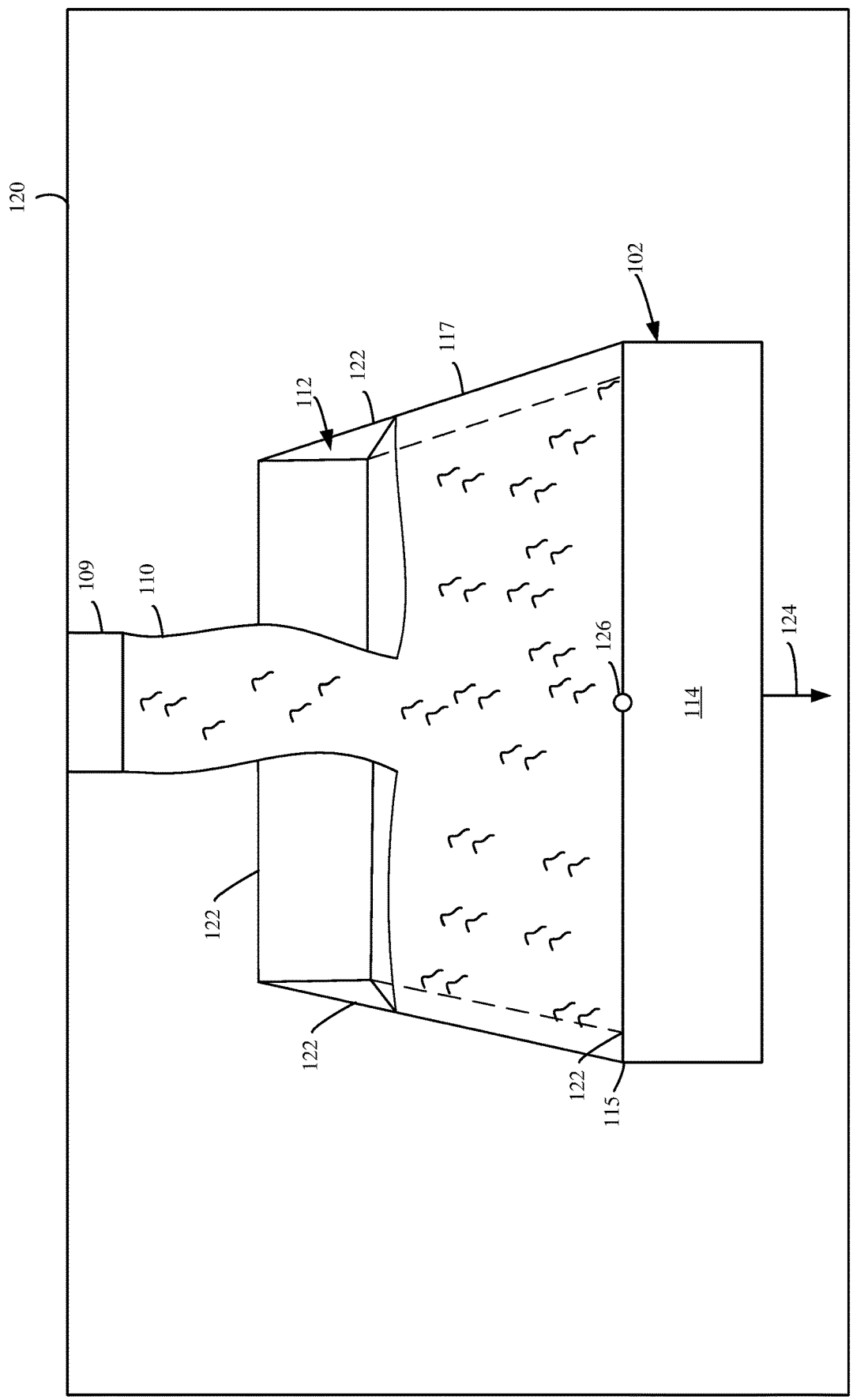
FIG. 3 is a pictorial illustration of one example of an image of the receiving vehicle captured by an image capture device.

FIG. 3 is a pictorial illustration showing one example of an image 120 that can be captured by the one or more cameras 106, 107. The image 120 shows an example in which receiving vehicle 102 (or cart 102) is used for receiving the material 110 unloaded by harvester 100. Therefore, some items shown in FIG. 3 are similar to those shown in FIG. 1, and they are similarly numbered. Image 120 thus shows flap 109 (which may be visible in the field of view of the cameras 106,107) as well as material 110 exiting spout 108 and entering into the receiving area 112 defined by the upper edges 122 of cart 102. The image processing system in the control system (described elsewhere) illustratively uses a machine learning system to identify the edges 122 defining the boundary of the receiving area 112, and the location of that boundary relative to harvester 100. In one example, the control system can also process the image 120 to identify the height of material 110 in receiving vehicle 102, and the location of that material in receiving vehicle 102, so that the position of the spout 108 and flap 109 can be controlled to fill in empty spaces or voids within the receiving vehicle to obtain an even fill of the receiving vehicle 102. In one example, based upon inputs from a position sensing system, the control system can also identify the direction of travel 124 of receiving vehicle 102 and harvester 100. In order to identify the boundary defined by edges 122, the control system can identify corners 115 and 117, and then extrapolate the position of the edges 122 based upon those corners and based upon a default, derived, or detected length of receiving vehicle 102. In another example, the control system can identify one corner (such as corner 115), and a line corresponding to the front edge 122, as well as a default width, a detected width, or derived width of receiving vehicle 102, in order to identify the other corner 117. In yet another example, the control system can identify a center point 126 between the two corners 115 and 117 to assist in identifying the location of the corners 115 and 117, as well as the other edges 122 of the receiving area 112. The control system can also identify other features of the receiving vehicle and the location of those features for use in identifying the boundary of the receiving area of the receiving vehicle.

Figure 4:
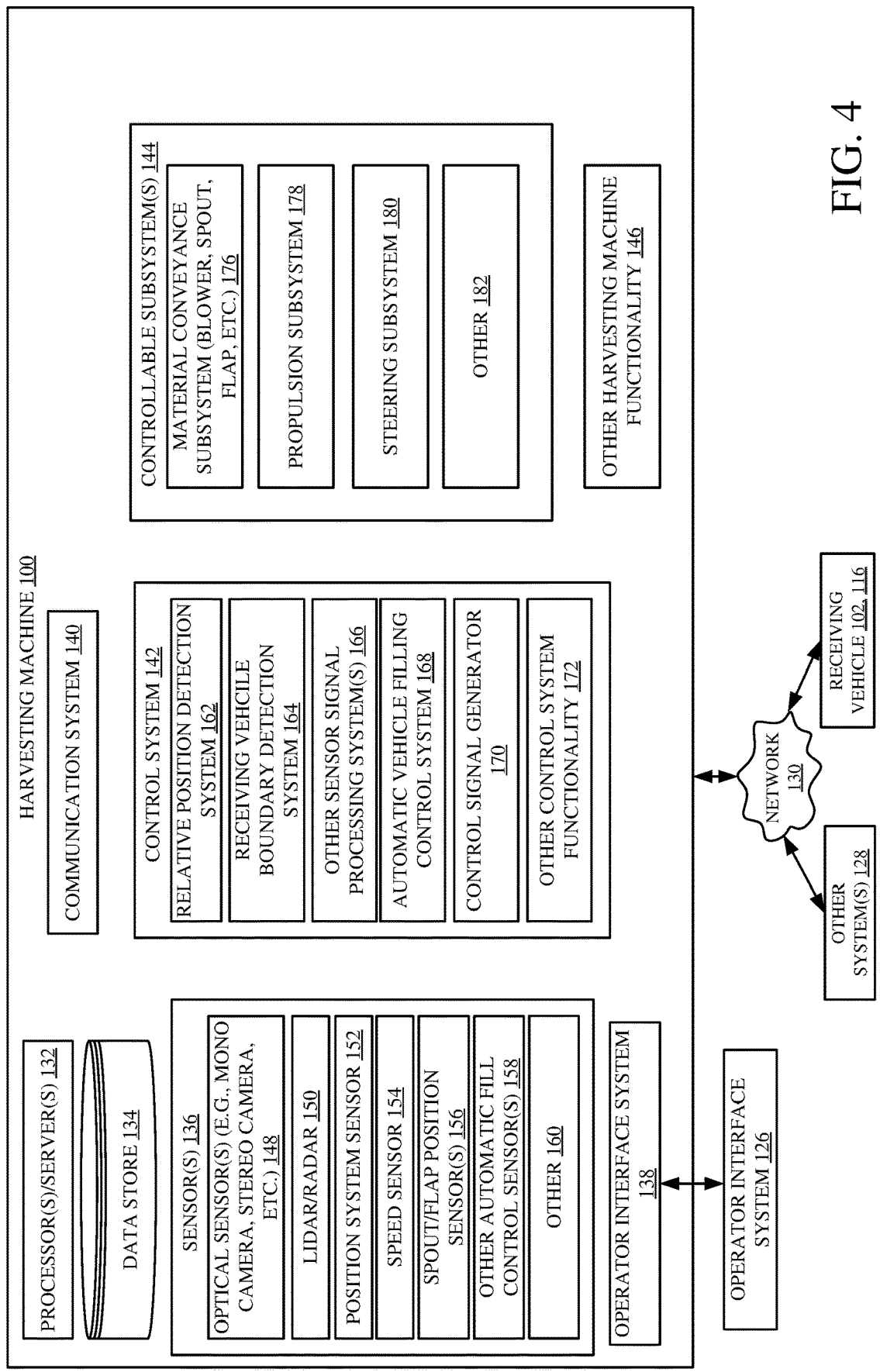
FIG. 4 is a block diagram of one example of a harvesting machine.

FIG. 4 is a block diagram showing one example of harvesting machine 100 in more detail. FIG. 4 shows that harvesting machine 100 can be operated by an operator 126 and can communicate with receiving vehicle 102 (or 116) as well as other systems or other vehicles 128 over a network 130. Network 130 can thus be a wide area network, a near field communication network, a local area network, a Wi-Fi network, a Bluetooth network, a cellular network, or any of a wide variety of other networks or combinations of networks.

In the example shown in FIG. 4, harvesting machine 100 includes one or more processors or servers 132, data store 134, sensors 136, operator interface system 138, communication system 140, control system 142, controllable subsystems 144, and a wide variety of other harvesting machine functionality 146. Sensors 136 can include optical sensors 148 (such as mono cameras, stereo cameras, etc.), RADAR or LIDAR systems 150, position system sensor 152, speed sensor 154, spout/flap position sensor(s) 156, other automatic fill control sensors 158, and other sensors 160. Control system 142 can include relative position detection system 162, receiving vehicle boundary detection system 164, other sensor signal processing systems 166, automatic vehicle filling control system 168, control signal generator 170, and other control system functionality 172. Controllable subsystems 144 can include material conveyance subsystem 174 (such as a blower that blows material 110, spout 108, flap 109, actuators that drive the position of spout 108, flap 109, etc.), propulsion subsystem 178, steering subsystem 180, and other items 182.

Before describing the overall operation of harvesting machine 100 in more detail, a description of some of the items in harvesting machine 100, and their operation, will first be provided. As discussed above, optical sensor 148 can include one or more mono cameras, a stereo camera, or other optical sensors. RADAR/LIDAR sensors 150 can be used to detect the location and distance of the receiving vehicle relative to harvester 102, and to detect other items. Position system sensor 152 can be a global navigation satellite system (GNSS) receiver, a cellular triangulation system, a dead reckoning system, or any of a wide variety of other systems that sense the position of harvesting machine 100 in a local or global coordinate system. Spout/flap position sensor 156 can be one or more sensors that sense the position of spout 108 and flap 109. Therefore, sensors 156 can be angle encoders, potentiometer, Hall effect sensors, or any of a wide variety of other sensors that sense the position of spout 108 relative to the frame or other portion of harvester 100, and the position of flap 109 relative to spout 108 or another known reference. The sensors 136 generate an output signal responsive to the variable that they sense.

Operator interface system 138 can include operator interface mechanisms that generate outputs for operator 126 and receive inputs from operator 126. Therefore, system 138 can include output mechanisms, such as an audio, visual, and/or haptic output system that generates visual outputs on a display, audible tones on a speaker, haptic outputs, etc., in order to convey information to operator 126. The interface mechanisms can also include input mechanisms such as levers, joysticks, a steering wheel, pedals, linkages, or other input mechanisms. Further, where system 138 includes a display, the input mechanisms may include icons, links, or other operator actuatable mechanisms that can be displayed on the display and actuated by a point and click device, a touch gesture, or a speech command (where speech recognition and/or speech synthesis are provided).

Communication system 140 facilitates the communication of items in harvesting system 100 with one another. Therefore, communication system 140 can be a controller area network (CAN) bus and bus controller or another type of communication system. Further, system 140 illustratively facilitates communication of information over network 130 to the receiving vehicle 102 and other systems 128. Therefore, the particular communication system 140 that is used may depend upon the configuration of network 130 over which system 140 is to communicate.

Relative position detection system 162 receives inputs from one or more sensors 136 and detects the relative position of the receiving vehicle relative to harvester 100. The present description will proceed with respect to the receiving vehicle being receiving vehicle 102 that is towed by tractor 104. However, the discussion could just as easily be continued with respect to the receiving vehicle being trailer 116, or another receiving vehicle. The discussion proceeds with respect to the receiving vehicle being vehicle 102, towed by tractor 104, for the sake of example only. Relative position detection system 162 may thus receive an input from optical sensors 148, RADAR/LIDAR sensors 150, position system sensor 152, or other sensors and detect the direction and distance of the location of the receiving vehicle 102 relative to harvester 100. System 162 can do this by identifying the location of the receiving vehicle 102 in a local or global coordinate system and comparing that to the location of harvester 100 in a local or global coordinate system. In another example, system 162 can detect the relative locations of the two vehicles based on the distance and direction of separation of the two vehicles, without regard to the absolute location of the two vehicles in a global or local coordinate system. System 162 can detect the locations of the two vehicles relative to one another in other ways as well.

Receiving vehicle boundary detection system 164 then receives an input from one or more optical sensors 148 and detects the boundary (or edges defining the boundary) of the receiving area 112 of receiving vehicle 102. This is done by performing processing of an image, or information derived from the image, using a machine learning system, such as a deep learning or artificial intelligence system (e.g., an artificial neural network, a convolutional neural network etc.). One example of the operation of system 164 is described in greater detail below with respect to FIGS. 5-7.

Other sensor signals that may be received by automatic vehicle filling control system 168. Automatic vehicle filling control system 168 illustratively receives the outputs from systems 164 and 166 and may receive input from other sensors 136 and identifies a desired position of the spout 108, flap 109, and other settings or other information that may be used in conveying material 110 to the receiving vehicle 102. Control signal generator 170 generates control signals based upon the desired position of spout 108 and flap 109 and other settings and applies the control signals to the controllable subsystems 144.

For instance, control signal generator 170 may receive an indication from automatic vehicle filling control system 168 indicative of the desired location of the position of the spout 108 and flap 109 and compare that desired position with the current position of the spout 108 and flap 109 received from spout/flap position sensor(s) 156. Based on the comparison, system 168 may generate a signal, to command the spout 108 and flap 109 in material conveyance subsystem 176 to move to the desired position. In another example, automatic vehicle filling control system 168 may generate an output indicating that harvesting machine 100 should accelerate or decelerate, and control signal generator 170 can generate an output to propulsion subsystem 178 to perform the acceleration or deceleration operations. Similarly, automatic vehicle filling control system 168 may generate an output indicating that harvesting machine 100 should steer in a certain direction, and control signal generator 170 then generates a control signal that may be applied to steering subsystem 180 to automatically steer machine 100 in the desired direction.

It will also be noted that, in some examples, harvesting machine 100 can establish communication with the tractor 104 that is towing receiving vehicle 102 to automatically send control signals to control the speed and/or heading of tractor 104 in order to change the relative position of the harvester 100 and receiving vehicle 102. These control signals are sometimes referred to as "nudges" in which case the tractor 104 may be commanded to momentarily accelerate to "nudge" the position of the receiving vehicle 102 in one direction relative to the harvester 100. In another example, the tractor 104 may be commanded to momentarily decelerate in order to "nudge" the location of the receiving vehicle in a different direction relative to the harvester 100. These are just examples of how automatic vehicle filling control system 168 can use control signal generator 170 to control harvesting machine 100 and/or the towing vehicle 104 that is towing receiving vehicle 102. Other control signals can be generated to control the filling operation in other ways as well.

Figure 5:
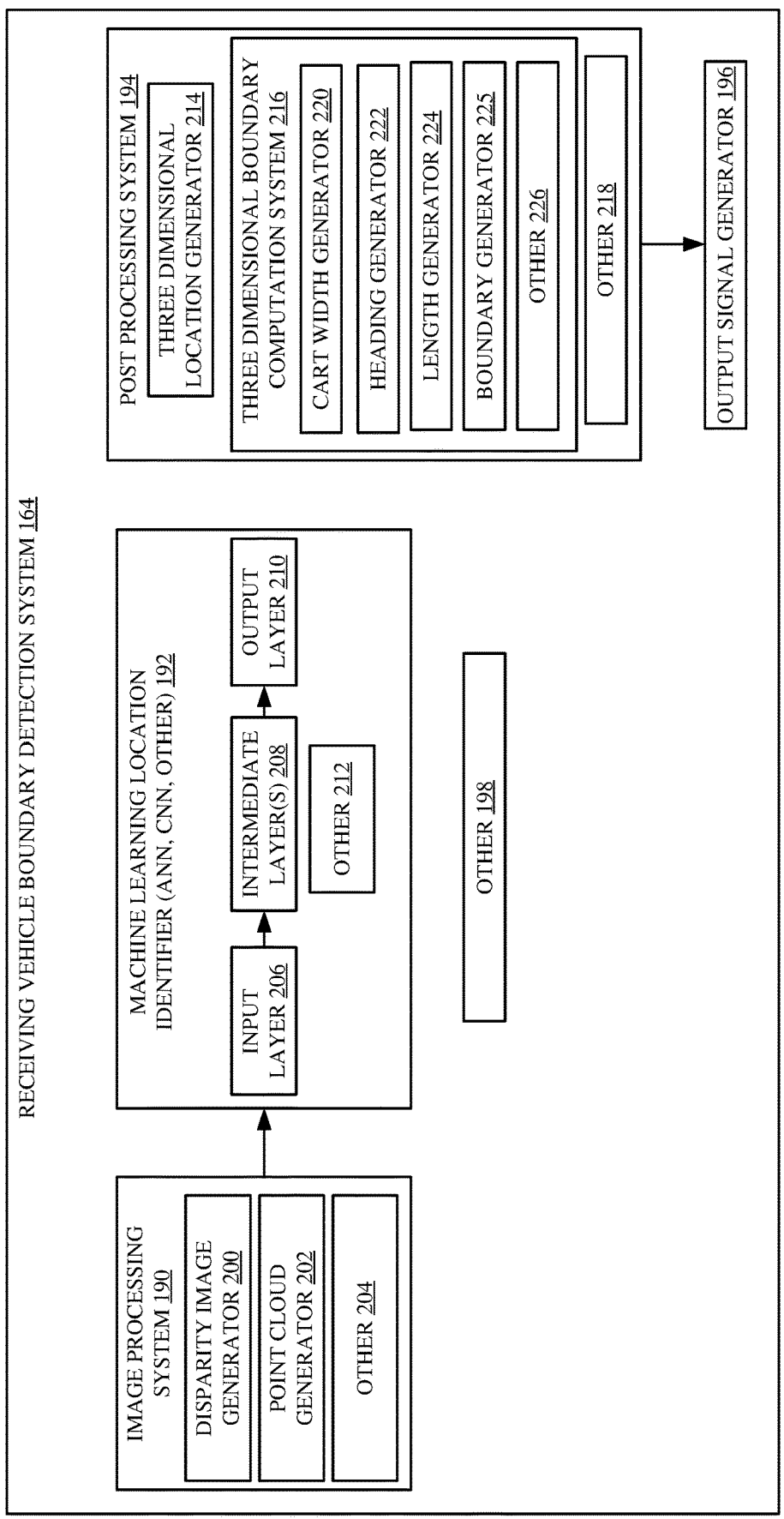
FIG. 5 is a block diagram of one example of a receiving vehicle boundary detection system.

FIG. 5 is a block diagram showing one example of receiving vehicle boundary detection system 164, in more detail. System 164, in the example shown in FIG. 5, includes image processing system 190, machine learning location identifier (e.g., ANN, CNN, other) 192, post processing system 194, output signal generator 196, and other items 198. Image processing system 190 illustratively includes disparity image generator 200, point cloud generator 202, and other items 204. Machine learning location identifier 192 illustratively includes an input layer 206, one or more intermediate layers 208, output layer 210, and it can include other items 212. Post processing system 194 can include three-dimensional location generator 214, three-dimensional boundary computation system 216, and other items 219. Three-dimensional boundary computation system 216 can include cart width generator 220, heading generator 222, length generator 224, boundary generator 225, and other items 226. Before describing the overall operation of receiving vehicle boundary detection system 164 in more detail, a description of some of the items in system 164, and their operation, will first be provided.

Image processing system 190 processes one or more images captured by an image capture device or optical sensors 148. Image processing system 190 can generate other information, that is derived from the captured image. For instance, disparity image generator 200 generates a disparity image based upon an input from stereo cameras. Point cloud generator 202 can generate a point cloud from the disparity image, or in other ways. Image processing system 190 can process images in other ways as well. For instance, where the captured image is an image captured by a mono camera, image processing system 190 can generate a depth image and point cloud generator 202 can generate a point cloud from the depth image.

The output of image processing system 190 is then passed through machine learning location identifier 192 to identify pixel locations in the image corresponding to features that can be used to identify the boundary of the receiving area 112. In one example, machine learning location identifier 192 includes a convolutional neural network with a plurality of fully connected layers. The layers can include an input layer 206, one or more intermediate layers 208, and an output layer 210. In one example, the output layer 210 includes neurons that identify pixel locations for the extracted features that are used to identify the boundary of the receiving area 112 of the cart 102. For instance, in one example, output layer 210 includes four neurons that identify the pixel locations of corners 115 and 117 (shown in FIG. 3). The pixel locations can be identified in a two-dimensional (x, y) coordinate system so that corner 115 is identified by a pixel location $(x_1, y_1)$ and corner 117 is identified by a pixel location $(x_2, y_2)$. Having output layer 210 identify the pixel locations of corners 115 and 117 is just one example. Instead, output layer 210 may identify the pixel location of one of the corners (e.g., corner 115) and the pixel locations corresponding to a line that extends along an edge 122 or that extends between corners 115 and 117 in FIG. 3. In another example, the output layer 210 can identify the pixel location of a central point 126 along an edge 122 which can be used in conjunction with a known width measurement of receiving vehicle 102 to identify the pixel location of corners 115 and 117. These are just examples, and output layer 210 can identify the locations (within the image) of other features that are extracted from the image and that can be used to identify the boundaries of the receiving area 112 of receiving vehicle 102.

Three-dimensional location generator 214 in post processing system 194 generates a three-dimensional location of the feature for which a pixel location was output by machine learning location identifier 192. For instance, once the pixel locations of corners 115 and 117 are known, then three-dimension location generator 214 generates an output of the three-dimensional location of those points. The three-dimensional location can be identified using coordinates in a local or global coordinate system. The three-dimensional locations can be identified in a relative fashion, such as relative to a known point on harvester 100, or in other ways. Three-dimensional boundary computation system 216 receives the three-dimensional location of the features identified by three-dimensional location generator 214 and generates an output indicative of the location of the boundary of the receiving area 112 of receiving vehicle 102, based upon the three-dimensional locations of the features.

For instance, using the three-dimensional location of the corners 115 and 117, cart width generator 220 can generate an output indicative of the width of receiving vehicle 102. Heading generator 222 can generate an output indicative of the heading of vehicle 102 (based on changes in its position indicated by position system sensor 152, or in other ways). Length generator 224 can generate an output indicative of the length of the receiving vehicle (estimated or detected) based on the information generated by three-dimensional boundary computation system 216. Boundary generator 225 generates an output indicative of the three-dimensional location of the boundary of the receiving area 112 of receiving vehicle 102. Output signal generator 198 then generates an output signal which can be output, for instance, to automatic vehicle filling control system 168. The output signal can identify the location of the boundary of the receiving area 112. That location can be identified relative to the location of spout 108 and/or flap 109, relative to the location of machine 100, as an absolute location in a coordinate system, and/or in other ways. The output signal from generator 198 can include other information as well.

Figure 6:
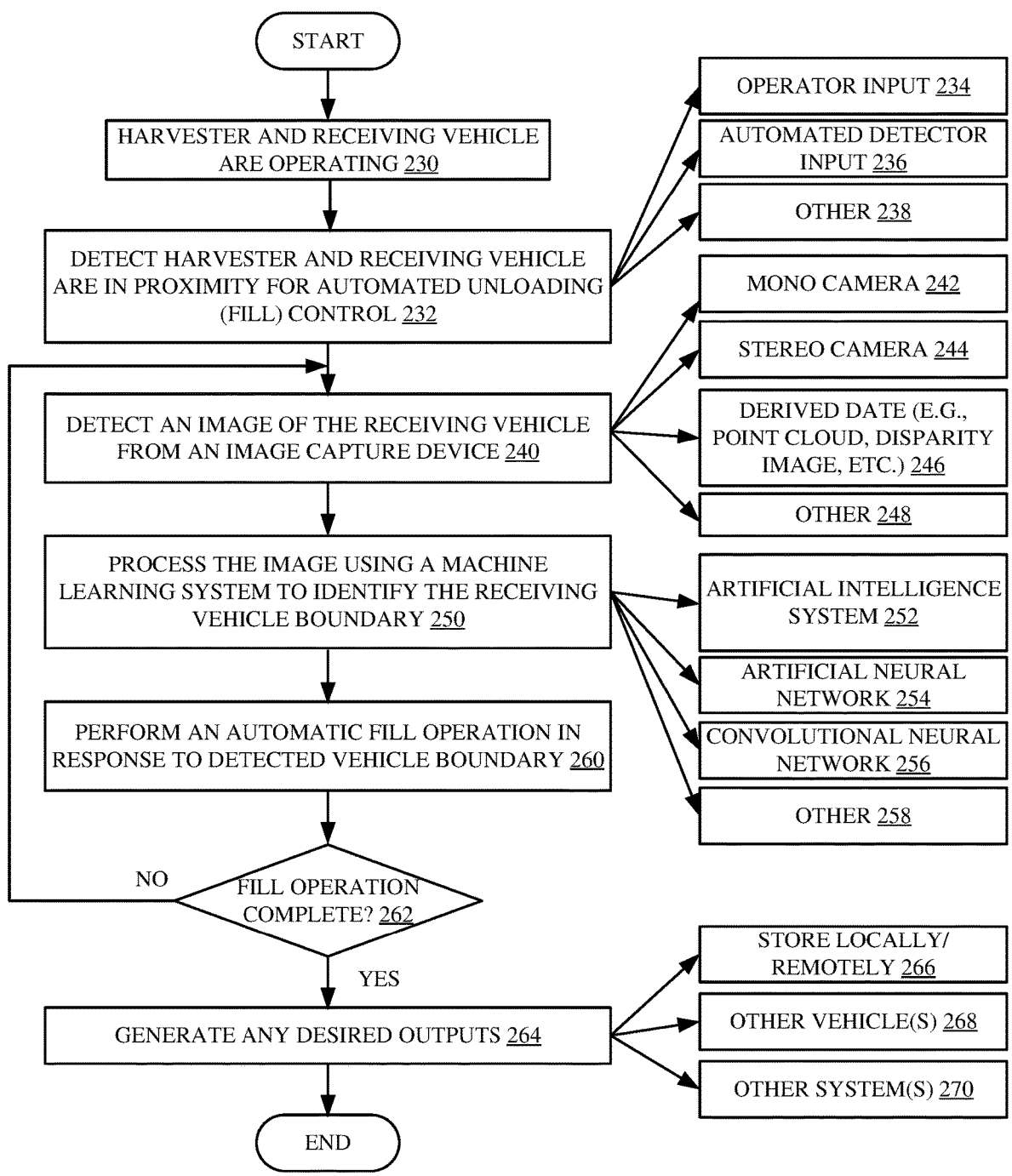
FIG. 6 is a flow diagram showing one example of the operation of the harvester.

FIG. 6 is a flow diagram illustrating one example of the operation of harvesting machine (or harvester) 100. It is first assumed that harvester 100 and receiving vehicle 102 (which may be towed by towing vehicle 104) are operating in a field. Having the harvester 100 and receiving vehicle 102 operating in the field is indicated by block 230 in the flow diagram of FIG. 6.

At some point, control system 142 detects that harvester 100 and receiving 102 are in close enough proximity to one another to begin an automated unloading operation, as indicated by block 232. For instance, operator 126 can provide an operator input 234 when the two vehicles are in close enough proximity to one another. In another example, automatic vehicle filling control system 168 can receive an automated input, such as from RADAR/LIDAR sensors 150, position system sensor 152, or other automatic fill control sensors 158, that indicate that receiving vehicle 102 and harvester 100 are in close enough proximity to begin automated unloading from vehicle 100 (or automated filling of vehicle 102). Receiving an automated detector input is indicated by block 236 in the flow diagram of FIG. 6. The proximity of the two vehicles can be detected in other ways as well, as indicated by block 238.

Optical sensor 148 detects an image of the receiving vehicle using an image capture device, such as cameras 106, 107, or another optical sensor 148. Detecting an image of the receiving vehicle is indicated by block 240 in the flow diagram of FIG. 6. The optical sensor 148 (or image capture device) may be a mono camera 242 or stereo cameras 244 or other devices. The image can be processed to derive other information from the captured image, such as a disparity image, a point cloud, etc. Deriving other data from the image is indicated by block 246.

The image can be detected in other ways as well, as indicated by block 248. The image or derived data is then processed using a machine learning system, such as receiving vehicle boundary detection system 164, to identify the receiving vehicle boundary (e.g., the boundary of the receiving area 112 of receiving vehicle 102) as indicated by block 250 in the flow diagram of FIG. 6. The processing can be performed using an artificial intelligence system 252, an artificial neural network 254, a convolutional neural network 256, or other machine learning or artificial intelligence system 258.

Based upon the detected boundary, automatic vehicle filling control system 168 performs an automatic fill operation, as indicated by block 260 in the flow diagram of FIG. 6. Until the fill operation is complete, as determined at block 262, operation reverts to block 240 where the optical sensors 148 continue to detect images of the receiving vehicle. Once the fill operation is complete, any desired outputs can be created, as indicated by block 264. Such outputs may be outputs to store parameters of the fill operation locally or remotely, as indicated by block 266. The outputs may be communicated to other receiving vehicles, as indicated by block 268, so that another receiving vehicle may come into position relative to harvester 100. The outputs can be to other systems 270, such as manufacturer systems, vendor systems, grain storage facilities, farm manager systems, etc.

Figure 7:
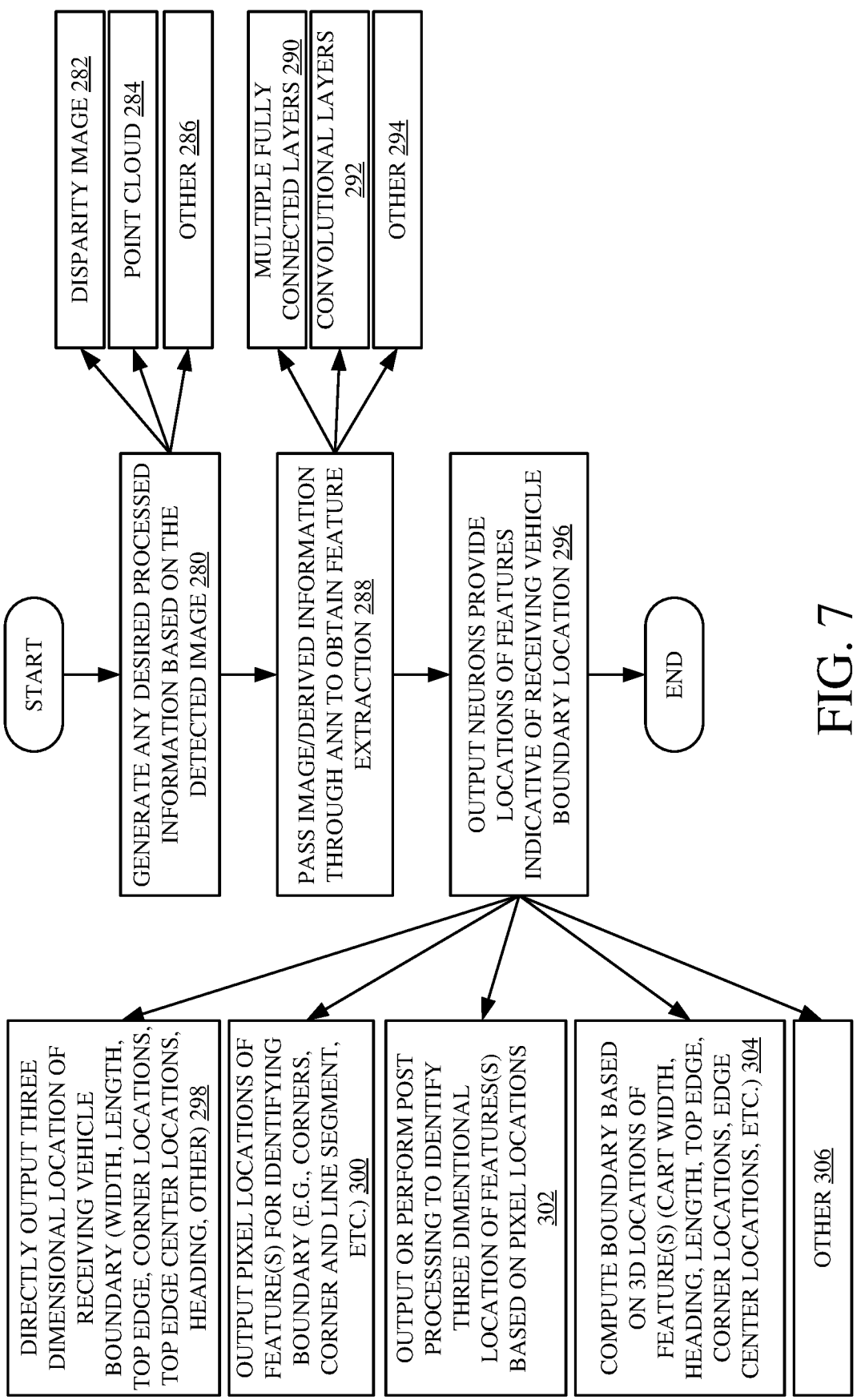
FIG. 7 is a flow diagram showing one example of the operation of the receiving vehicle boundary detection system.

FIG. 7 is a flow diagram illustrating one example of the operation of receiving vehicle boundary detection system 164 in more detail. Image processing system 190 first generates any desired processed information based upon the detected image, as indicated by block 280 in the flow diagram of FIG. 7. For instance, disparity image generator 200 can generate a disparity image 282. Point cloud generator 202 can generate a point cloud 284, and other items 204 can generate other derived data 286 as well. The image and/or processed or derived information is then passed through an artificial neural network to perform feature extraction on the image, as indicated by block 288. The artificial neural network can have a plurality of fully connected layers, as indicated by block 290. The artificial neural network may, for example, be a convolutional neural network, as indicted by block 292. Features can also be extracted using an artificial neural network in other ways as well, as indicated by block 294.

The output layer 210 provides locations of features that may be used to identify the boundary of the receiving vehicle. Configuring the output layer 210 in this way is indicated by block 296 in the flow diagram of FIG. 7. For instance, in one example, the output layers 210 provides an output that directly indicates the three-dimensional location of the receiving vehicle boundary (such as the location of the edges that define the width, and length of the receiving area), and/or corner locations. The output layer 210 can provide the output to directly identify the three-dimensional location of the center of an edge, along with the heading or other information that can be used to identify the receiving vehicle boundary. Directly outputting the three-dimensional location of the receiving vehicle boundary (or of a feature from which the boundary can be identified) is indicated by block 298. Instead of directly outputting the three-dimensional location of the feature(s) (or in addition to that), the output neurons can identify the pixel location of the features, such as the pixel locations of the corners, a single corner and a line defining the edge, etc. in the image. Outputting the pixel locations of identified features is indicated by block 300 in the flow diagram of FIG. 7. It will also be noted that while the output of the artificial neural network can identify the three-dimensional location of the features (e.g., corners) based upon the pixel locations, the three-dimensional locations can be identified from the pixel locations or in other ways in a post processing step. Identifying the three-dimensional locations of the corners or other features of the receiving vehicle is indicated by block 302 in the flow diagram of FIG. 7.

Based upon the three-dimensional locations of the features identified in the image, the boundary of the receiving vehicle can be calculated, estimated, or computed. For instance, information used to define the boundary of the receiving area of the receiving vehicle can be computed, such as the cart width, the cart heading, the cart length, the top edge corner locations of the cart, the top edge center location of the cart, or other features. Based upon these features, the boundary of the receiving area can be computed, as indicated by block 304. The output layer 210 can take other forms, or be processed in other ways, either by the machine learning system, or in a post processing system, or both, to identify the boundary of the receiving area in the receiving vehicle, as indicated by block 306 in the flow diagram of FIG. 7. The location of the boundary of the receiving area of the receiving vehicle can then be used for automated fill control as discussed elsewhere.

The present description thus describes a system in which a machine learning system is used to identify a boundary of the receiving area of the receiving vehicle. The location of the boundary is computed and can be used to perform automatic fill control to fill the receiving vehicle with material. The machine learning system can be trained over a wide variety of different conditions to more accurately identify the boundary of the receiving area, even under adverse conditions, some of which have been described above. This increases the accuracy with which the automatic fill operation can be conducted.

It will be noted that the above discussion has described a variety of different systems, components, sensors, generators, layers, identifiers, and/or logic. It will be appreciated that such systems, components, sensors, generators, layers, identifiers, and/or logic can be comprised of hardware items (such as processors and associated memory, or other processing components, some of which are described below) that perform the functions associated with those systems, components, sensors, generators, layers, identifiers, and/or logic. In addition, the systems, components, sensors, generators, layers, identifiers, and/or logic can be comprised of software that is loaded into a memory and is subsequently executed by a processor or server, or other computing component, as described below. The systems, components, sensors, generators, layers, identifiers, and/or logic can also be comprised of different combinations of hardware, software, firmware, etc., some examples of which are described below. These are only some examples of different structures that can be used to form the systems, components, sensors, generators, layers, identifiers, and/or logic described above. Other structures can be used as well.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
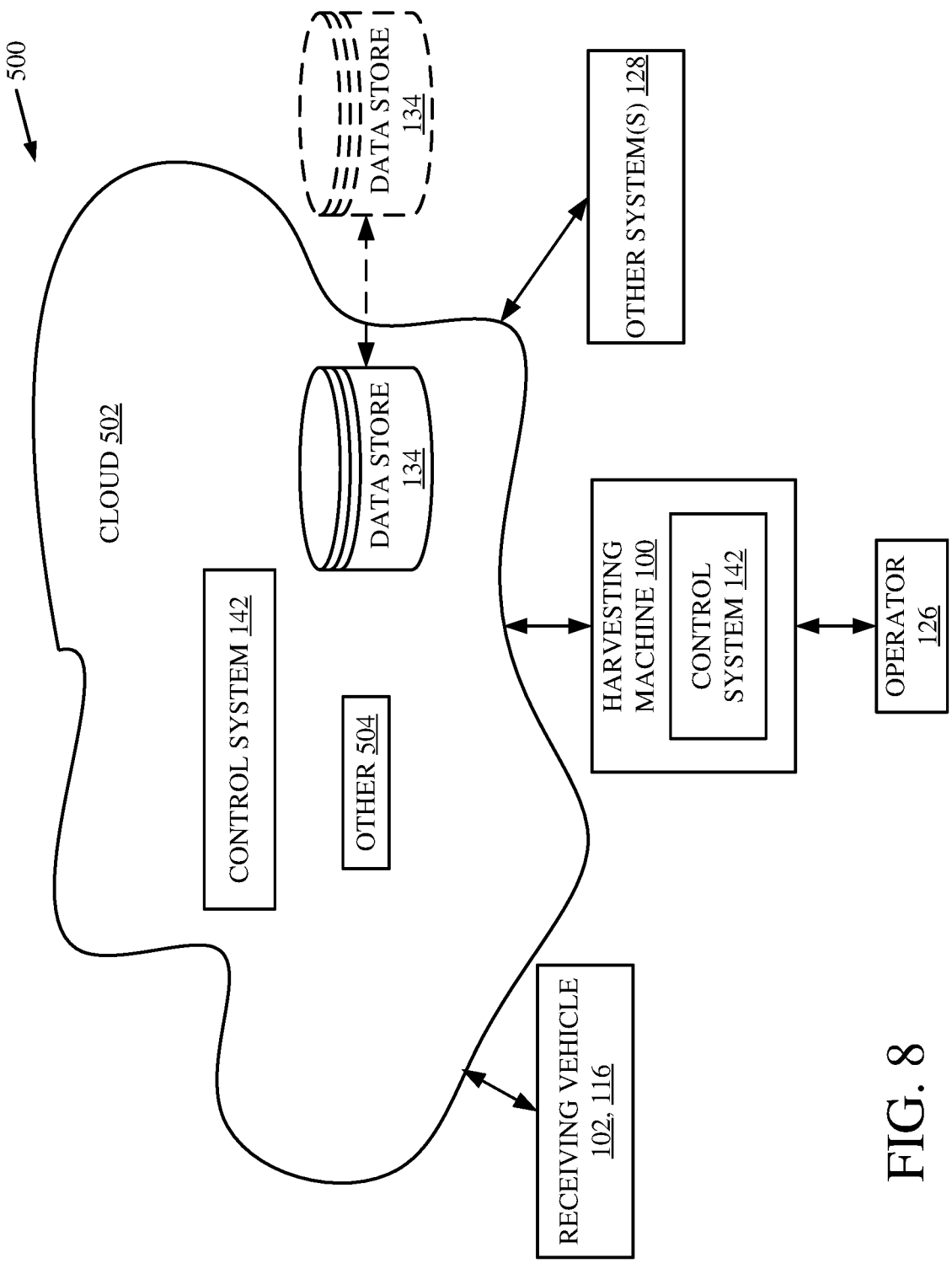
FIG. 8 is a block diagram showing one example of a harvesting machine deployed in a remote server architecture.

FIG. 8 is a block diagram illustrating harvesting machine 100, shown in previous FIGS., except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in previous FIGS. and they are similarly numbered. FIG. 8 specifically shows that data store 134, control system 142 (or other items 504) can be located at a remote server location 502. Therefore, harvesting machine 100 accesses those systems through remote server location 502.

FIG. 8 also depicts another example of a remote server architecture. FIG. 8 shows that it is also contemplated that some elements of previous FIGS. can be disposed at remote server location 502 while others are not. By way of example, one or more of data store 134, or other items can be disposed at a location separate from location 502, and accessed through the remote server at location 502. Regardless of where the items are located, the items can be accessed directly by harvesting machine 100, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
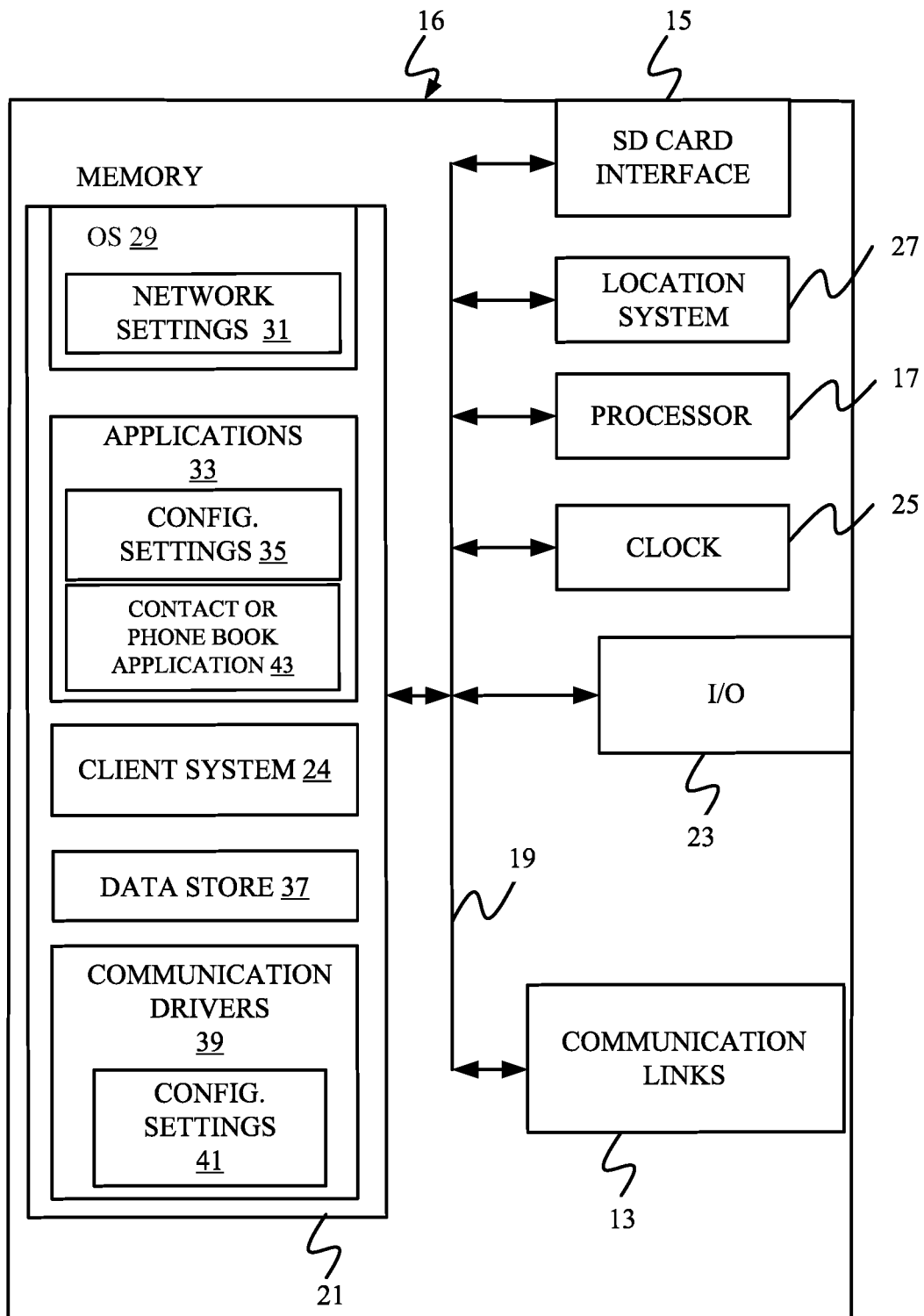
FIGS. 9-11 show examples of mobile devices that can be used in the machines described in previous figures.
Figure 10:
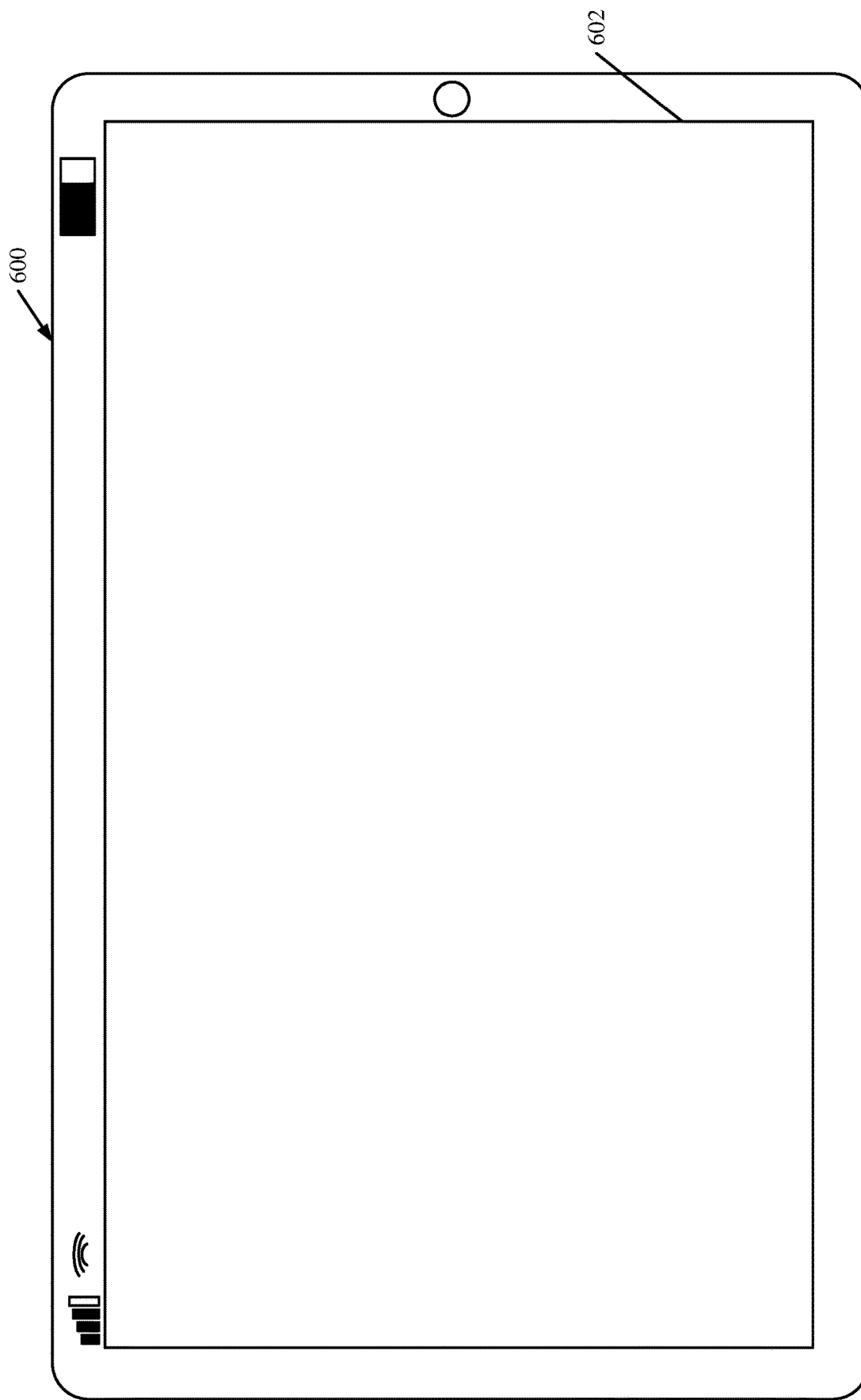
Figure 11:
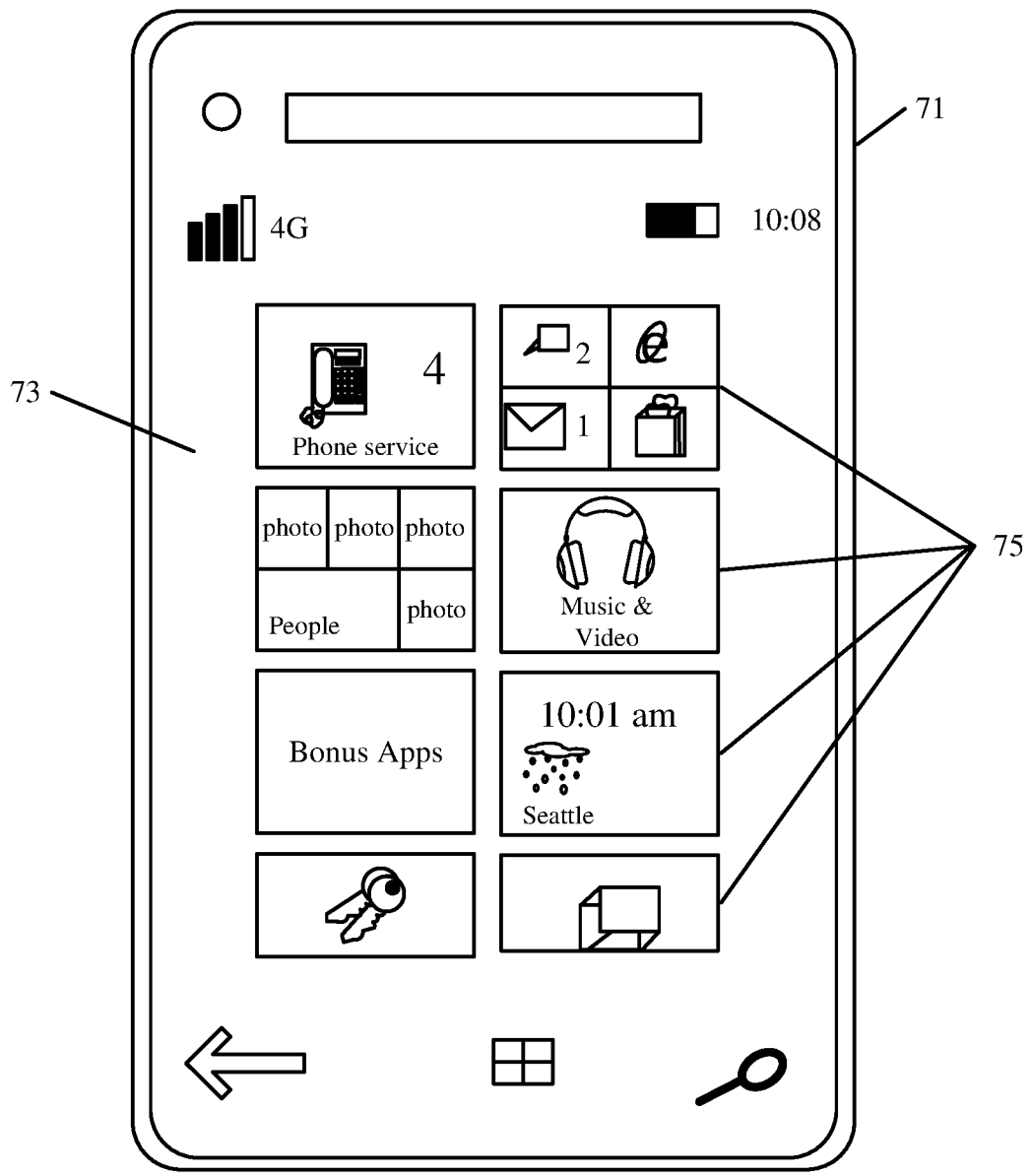

FIG. 9 is a simplified block diagram of one illustrative example of a handheld or mobile computing device that can be used as a user's or client's hand held device 16, in which the present system (or parts of it) can be deployed. For instance, a mobile device can be deployed in the operator compartment of harvesting machine 100 for use in generating, processing, or displaying the images from camera 106, the settings are actuators, etc. FIGS. 10-11 are examples of handheld or mobile devices.

FIG. 9 provides a general block diagram of the components of a client device 16 that can run some components shown in previous FIGS., that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. System 27 can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. Computer 600 can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
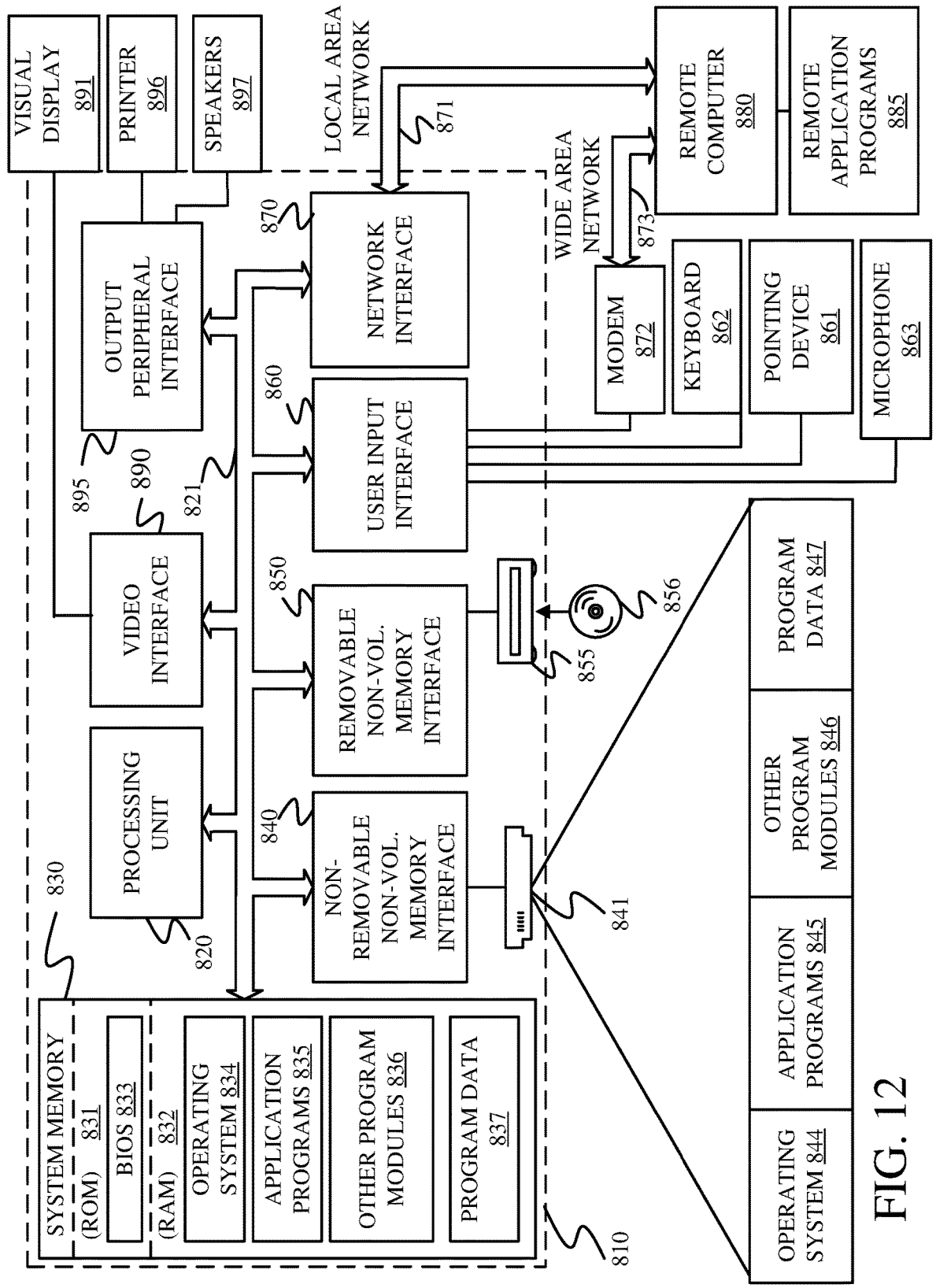
FIG. 12 is a block diagram showing one example of a computing environment that can be used in the machines and systems described with respect to previous figures.

FIG. 12 is one example of a computing environment in which elements of previous FIGS., or parts of them, (for example) can be deployed. With reference to FIG. 12, an example system for implementing some embodiments includes a computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different example described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A material conveying vehicle, comprising:
a material conveyance subsystem that conveys material to a receiving vehicle;
a camera that captures an image of the receiving vehicle;
an image processing system configured to generate derived information based on the image;
a machine learning system that identifies, based on the derived information, at least one corner of an edge of a receiving area of the receiving vehicle and generates a pixel location of the at least one corner in the image;
a boundary identification system that identifies a boundary of the receiving area of the receiving vehicle based on the pixel location of the at least one corner; and
a control signal generator generating a control signal to control the material conveyance subsystem based on the identified boundary of the receiving area.

2. The material conveying vehicle of claim 1 wherein the machine learning system comprises an artificial intelligence system.

3. The material conveying vehicle of claim 2 wherein the artificial intelligence system comprises an artificial neural network with a plurality of fully interconnected network layers.

4. The material conveying vehicle of claim 3 wherein the artificial neural network comprises a convolutional neural network.

5. The material conveying vehicle of claim 1 wherein the camera is a stereo camera, wherein the image comprises an image from the stereo camera, and wherein the image processing system comprises:
a disparity image generator configured to generate, as the derived information, a disparity image, the machine learning system being configured to identify the at least one corner of the receiving vehicle based on the disparity image.

6. The material conveying vehicle of claim 1, wherein the edge of the receiving area corresponds to a portion of an upper edge of the receiving area.

7. The material conveying vehicle of claim 1 wherein the boundary identification system comprises:
a three-dimensional (3D) location generator configured to identify a 3D location of the at least one corner of the receiving vehicle based on the pixel location.

8. The material conveying vehicle of claim 7 wherein the boundary identification system comprises:
a boundary generator configured to identify a 3D location of the boundary of the receiving area based on the 3D location of the at least one corner of the receiving vehicle.

9. The material conveying vehicle of claim 1 and further comprising:
a propulsion subsystem; and
a steering subsystem, wherein the control signal generator is configured to generate the control signal to control at least one of the steering subsystem and the propulsion subsystem.

10. The material conveying vehicle of claim 1 wherein the control signal generator is configured to generate the control signal to control the receiving vehicle based on the identified boundary of the receiving area.

11. A control system for controlling a material conveyance operation, comprising:
a camera that captures an image of a receiving vehicle receiving material from a material conveying vehicle;
an image processing system configured to generate derived information based on the image;
a machine learning system that identifies, based on the derived information, at least one corner of an opening of the receiving vehicle based on the image and generates a pixel location of the at least one corner in the image;
a boundary identification system that identifies a plurality of upper edges that define a boundary of the opening of the receiving vehicle based on the pixel location of the at least one corner; and
a control signal generator generating a control signal to control the material conveyance operation based on the identified plurality of upper edges that define the boundary of the opening.

12. The control system of claim 11 wherein the machine learning system comprises:
a convolutional neural network.

13. The control system of claim 11 and further comprising:
an image processing system configured to generate derived information based on the image, the machine learning system identifying the at least one corner of the opening of the receiving vehicle based on the derived information.

14. The control system of claim 13 wherein the camera comprises a stereo camera and wherein the image processing system comprises:
a disparity image generator configured to generate, as the derived information, a disparity image, the machine learning system being configured to identify the at least one corner of the opening of the receiving vehicle based on the disparity image.

15. The control system of claim 11 wherein the machine learning system is configured to generate an output, as an indication of the at least one corner, a pixel location of the at least one corner of the opening of the receiving vehicle in the image and wherein the boundary identification system comprises:
a three-dimensional (3D) location generator configured to identify a 3D location of the at least one corner of the opening of the receiving vehicle based on the pixel location.

16. A method of controlling a material conveyance operation that conveys material from a material conveying vehicle to a material receiving vehicle, the method comprising:
capturing an image of the material receiving vehicle receiving material from the material conveying vehicle, the image including at least a portion of a material receptacle of the material receiving vehicle;
performing feature extraction using a machine learning system to identify a plurality of corners of the portion of the material receptacle of the material receiving vehicle based on the image and to identify pixel locations of the plurality of corners in the image;
identifying a boundary of an opening of the material receptacle of the material receiving vehicle based on the pixel locations of the plurality of corners of the portion of the material receptacle of the material receiving vehicle; and
generating a control signal to control the material conveyance operation based on the identified boundary of the opening of the material receptacle of the material receiving vehicle.

17. The method of claim 16 wherein performing feature extraction comprises:
- performing feature extraction using an artificial neural network to identify the plurality of corners of the portion of the material receptacle of the material receiving vehicle to extrapolate a position of an upper edge of the material receptacle of the material receiving vehicle, or a plurality of points on the upper edge of the material receptacle of the material receiving vehicle.

18. The method of claim 16 wherein the material receptacle of the material receiving vehicle comprises a length, a width, and a height, and wherein the identified plurality of corners of the material receptacle of the material receiving vehicle includes, at least, a first corner and a second corner distanced across the width of the material receptacle of the material receiving vehicle.

\* \* \* \* \*